United States Patent [19]

Kress et al.

[11] Patent Number: 4,632,628

[45] Date of Patent: Dec. 30, 1986

[54] SIDE-EJECTION VEHICLE

[75] Inventors: Ralph H. Kress, Peoria; Jackson C. Medley, Brimfield, both of Ill.

[73] Assignee: Kress Corporation, Brimfield, Ill.

[21] Appl. No.: 790,774

[22] Filed: Oct. 24, 1985

Related U.S. Application Data

[63] Continuation of Ser. No. 701,652, Feb. 14, 1985, abandoned, which is a continuation of Ser. No. 441,536, Nov. 15, 1982, abandoned.

[51] Int. Cl.4 ................................................ B60P 1/16
[52] U.S. Cl. ..................................... 414/513; 414/517
[58] Field of Search ............... 414/509, 513, 517, 519, 414/514–516; 92/87, 165, 168

[56] References Cited

U.S. PATENT DOCUMENTS

| | | | |
|---|---|---|---|
| 671,599 | 4/1901 | Koffler | 414/509 |
| 2,101,882 | 12/1937 | Vessey | 414/514 |
| 2,693,890 | 11/1954 | Bridge | 414/509 |
| 2,912,128 | 11/1959 | Kamin | 414/509 X |
| 3,007,589 | 11/1961 | Galloway | 414/503 |
| 3,075,776 | 1/1963 | Ament et al. | 414/509 X |
| 3,257,012 | 6/1966 | Berolzheimer | 414/513 |
| 3,349,931 | 10/1967 | Wagner | 414/512 |
| 3,524,559 | 8/1970 | Osborne | 414/517 |
| 3,768,672 | 10/1973 | Grooss | 414/513 X |
| 3,815,764 | 6/1974 | Gilfillan et al. | 414/513 |
| 3,820,818 | 6/1974 | Kress et al. | 280/672 |
| 3,827,753 | 8/1974 | Pitts | 414/517 X |
| 3,953,170 | 4/1976 | Webb | 414/517 |
| 4,049,137 | 9/1977 | Meyer | 414/517 X |
| 4,055,007 | 10/1977 | Johnson | 414/513 X |
| 4,071,153 | 1/1978 | Booher | 414/513 |
| 4,090,627 | 5/1978 | Teti | 414/483 |

FOREIGN PATENT DOCUMENTS

| | | | |
|---|---|---|---|
| 8006176 | 6/1982 | Netherlands | 414/513 |
| 763203 | 9/1980 | U.S.S.R. | 414/515 |

OTHER PUBLICATIONS

"Difco Dump Cars", undated publication D723 of Difco, Inc.

Primary Examiner—Joseph E. Valenza
Assistant Examiner—David A. Bucci
Attorney, Agent, or Firm—Leydig, Voit & Mayer, Ltd.

[57] ABSTRACT

A side ejection mechanism which may be integrated either onto a trailer or into a unit truck employs a laterally translatable ejection ram to push a payload of material off the side of a load bed. The ejection ram is actuated at its midpoint with a ridged rail and mating spaced roller pair at each end of the ejection ram preventing cocking and tilting as the ram traverses the load bed. A drop gate may be provided opposite the load bed to serve as a wall when up and a lateral deflector when down. The mechanism is designed to permit the rear face of the ejection ram to clear the load bed of any overflow material as the ram is retracted.

8 Claims, 11 Drawing Figures

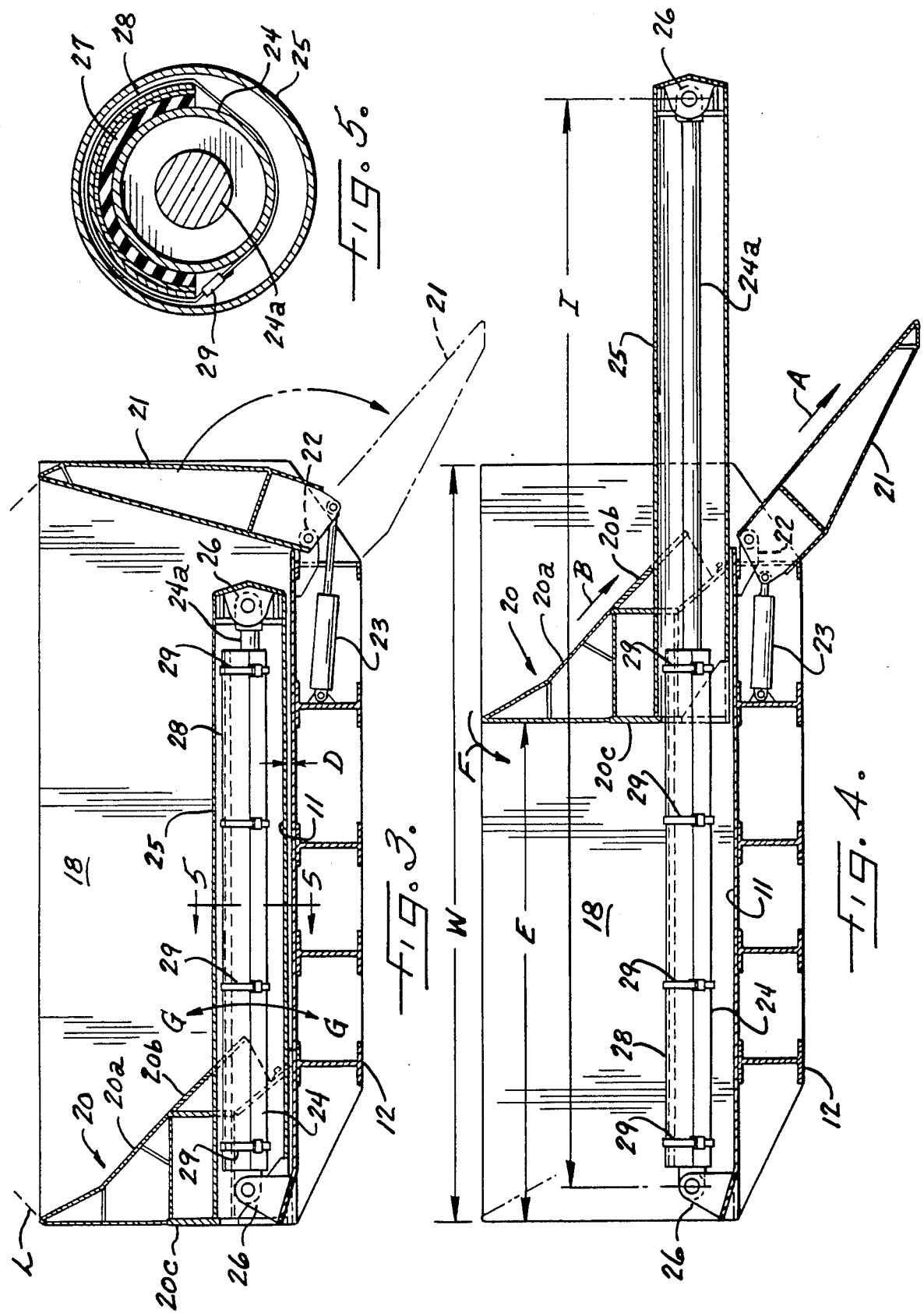

U.S. Patent  Dec. 30, 1986  Sheet 3 of 4  4,632,628
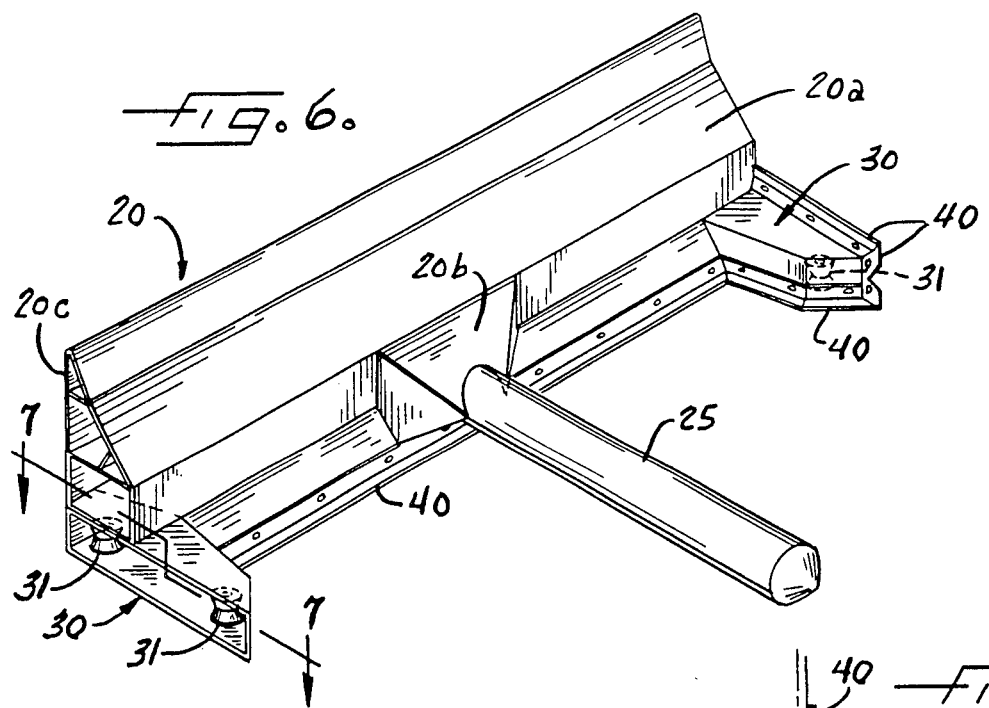
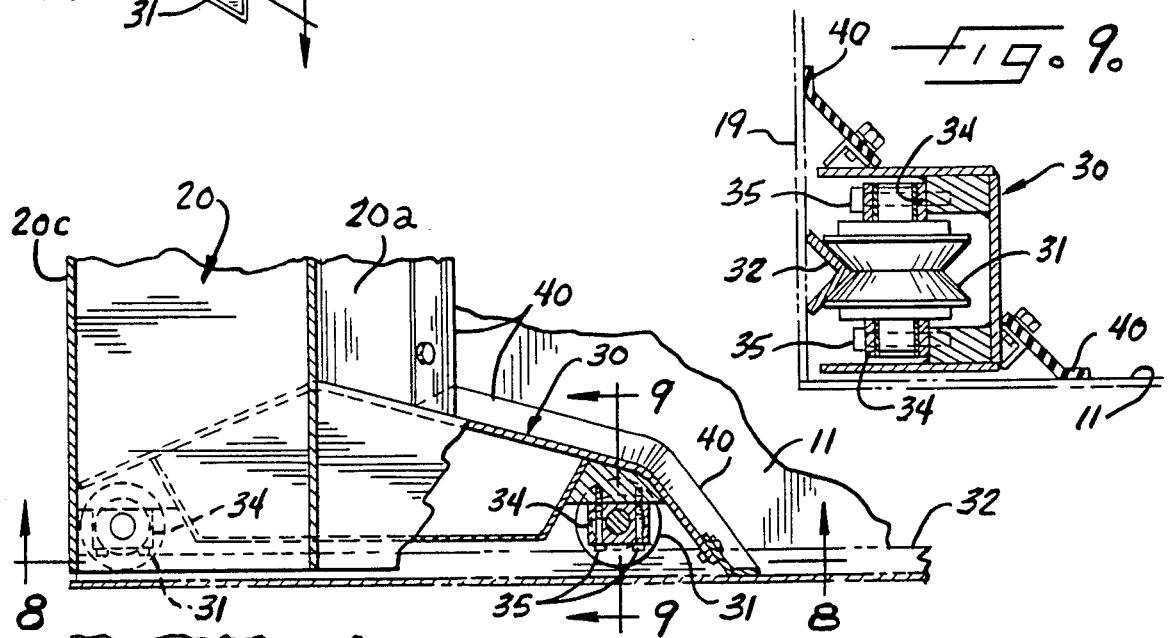
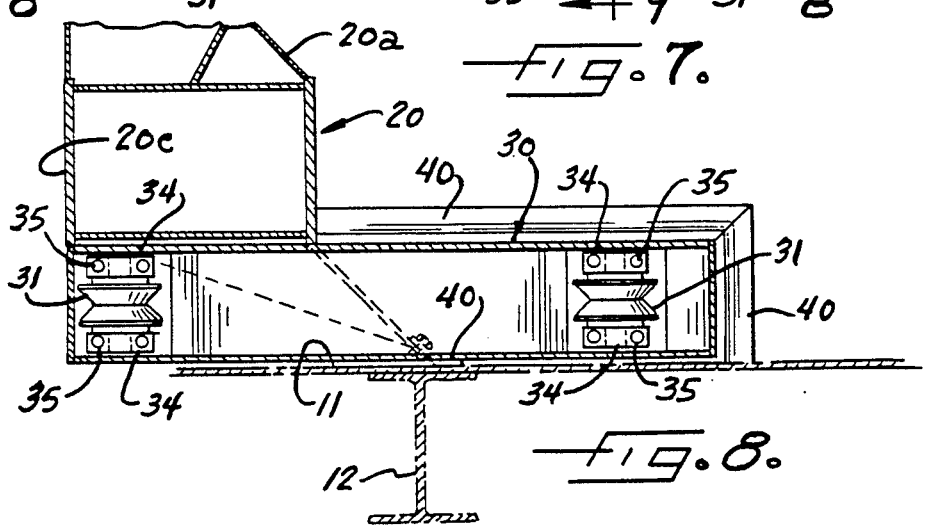

SIDE-EJECTION VEHICLE

This application is a continuation of application Ser. No. 701,652 filed Feb. 14, 1985, now abandoned which is a continuation of application Ser. No. 441,536, filed Nov. 15, 1982 now abandoned.

This invention relates generally to trucks and trailers for carrying bulk materials, such as coal, ore, overburden, etc., as in mining operations. More specifically, the invention concerns such vehicles which unload their payload by pushing it laterally off the load bed using a pusher blade. This side-ejection arrangement offers several significant advantages over conventional vehicles with tipping load boxes.

Those skilled in the art will recognize that among such advantages of side-ejection for discharging a load are the ability to control the rate of discharge more accurately than is often possible with conventional dump-type vehicles, especially in the case of sticky materials. Other significant advantages are the ability to discharge the payload over a bank without changing direction and without stopping. By eliminating the increased forces transmitted by the wheels to the bank when braking and changing direction, the risk of collapsing the bank edge through excessive loading is decreased. Similarly, during discharge, when the load in conventional dump-type vehicles is shifted to and borne by the rear wheels, the load per wheel with side-ejection never increases, instead it steadily decreases. This is extremely important when discharging material at the very edge of a bank.

The ability to control the rate of discharge in combination with the ability to discharge a load without changing direction and without stopping is also useful in the building of berms and the like. Similarly, a side-ejection arrangement permits the convenient laying down of an uncompacted surface layer by making a series of adjacent parallel passes. This capability is especially useful in land reclamanation applications where conventional spreading and grading equipment can result in undesirable compaction.

Moreover, side ejection permits the use of a tandem unit which can discharge the load from both load beds and leave the site without causing a portion of the vehicle to run over the discharged material.

Yet another advantage of the side-ejection arrangement of the present invention is the potential for reduction in the ratio of the empty vehicle weight to the payload through the elimination of essentially a dual frame arrangement in conventional dump-type vehicles—one for the vehicle chassis and one for the tipping box. With the side-ejection arrangement, the vehicle frame is integral with the load bed, not only potentially reducing weight but also offering improvements in structural integrity over conventional dump-type configurations.

Still another advantage is increased stability through the maintenance of a low center of gravity when discharging the load.

It is the primary aim of the present invention to provide a basic side ejection design offering the above advantages using a relatively simple and reliable mechanism which may be readily adapted for a particular application considering such factors as the nature and amount of the material to be moved, the nature of the terrain to be traveled, the grades involved, road widths, etc.

Other objects and advantages of the invention will become apparent upon reading the following detailed description and upon reference to the drawings, in which:

FIG. 3 is a section of the trailer along lines 3—3 in FIGS. 1 and 2 showing the ejection ram in the retracted position;

FIG. 4 is a section similar to that in FIG. 3 but with the ejection ram in the extended position;

FIG. 5 is a section through the ram tube and cylinder taken along the line 5—5 in FIG. 3;

FIG. 6 is a perspective view of the ejection ram of the trailer of FIGS. 1-3;

FIG. 7 is a section of the side roller mechanism taken along line 7—7 of FIG. 6;

FIG. 8 is an end view of the side roller mechanism as viewed from line 8—8 in FIG. 7;

FIG. 9 is a section of the side roller mechanism taken along line 9—9 of FIG. 7;

While the invention will be described in connection with preferred embodiments, it will be understood that we do not intend to limit the invention to those embodiments. On the contrary, we intend to cover all alternatives, modifications and equivalents as may be included within the spirit and scope of the invention as defined by the appended claims.

Figure 1:
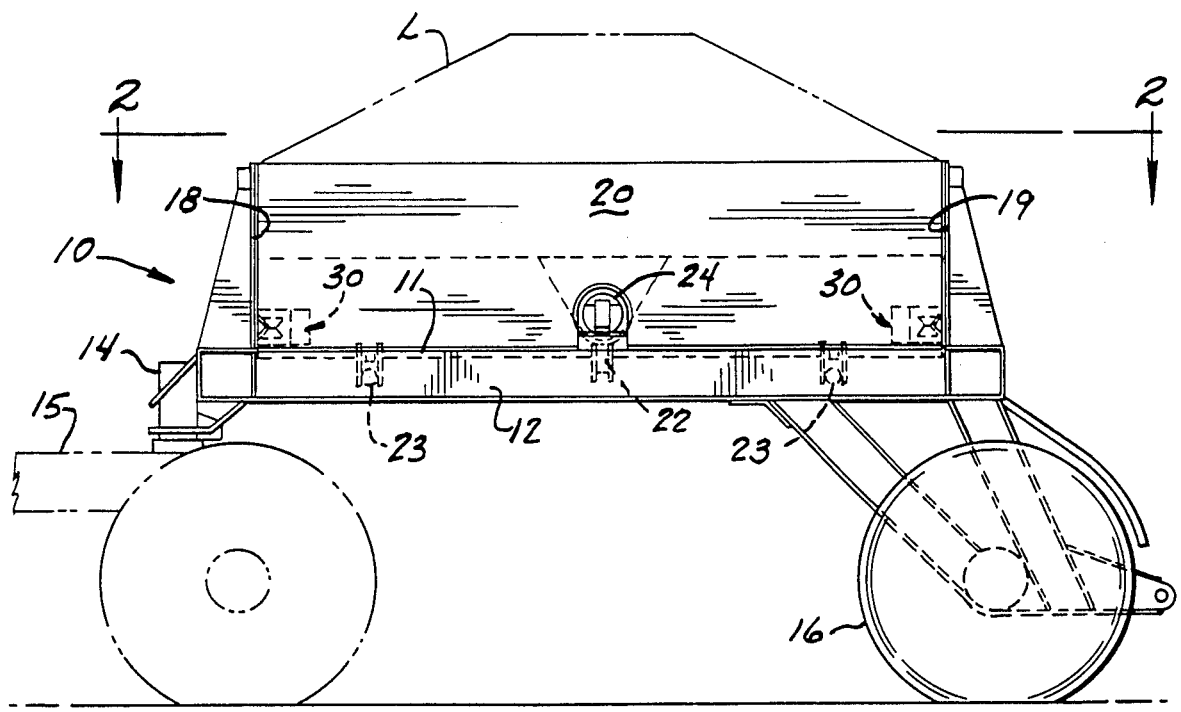
FIG. 1 is a side elevation of a trailer embodying the present invention.
Figure 10:
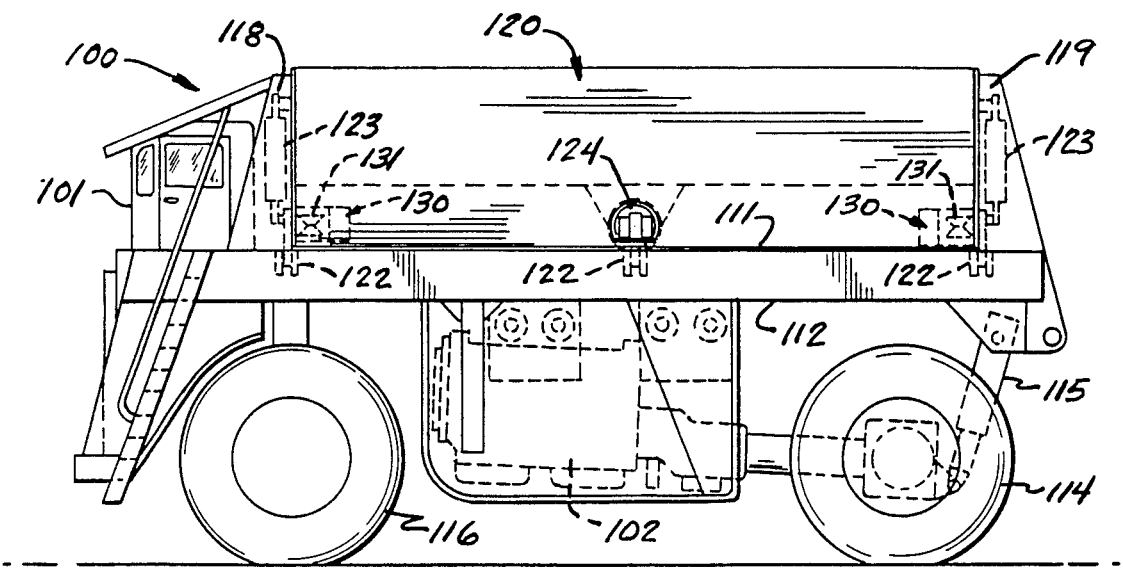
FIG. 10 is a side elevation of a unit truck embodying the present invention.
Figure 11:
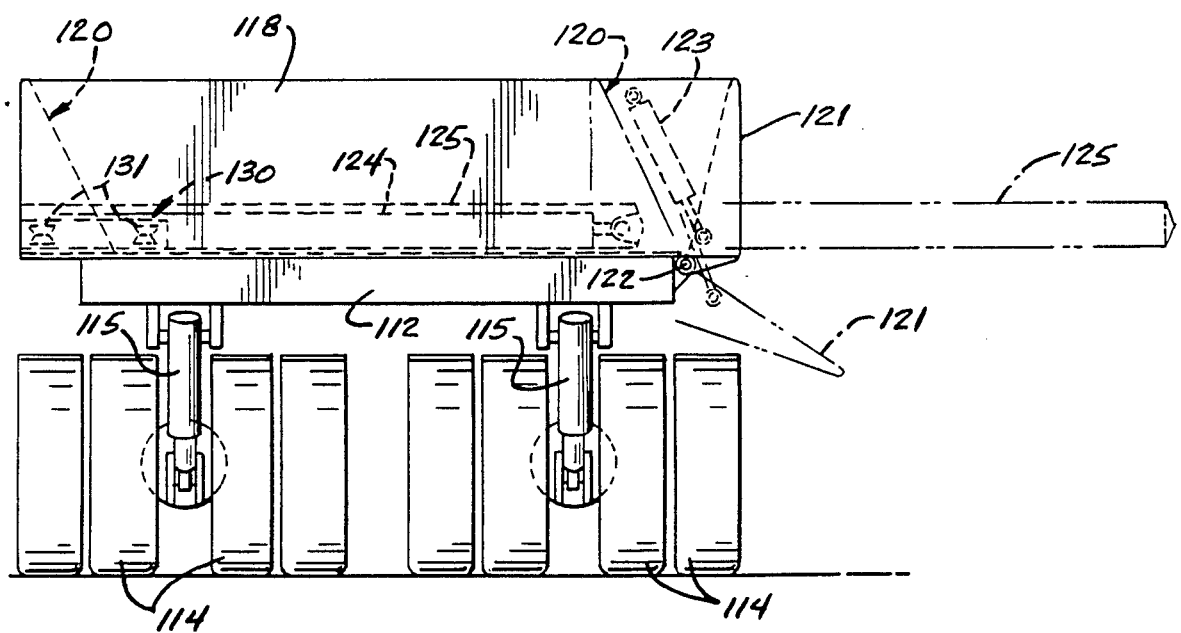
FIG. 11 is a rear elevation of the truck shown in FIG. 10.

Turning now to the drawings, there is shown in FIG. 1 a trailer 10 embodying the invention shown carrying a heaped load L. In accordance with the invention, the trailer includes a substantially flat load bed 11 resting upon the vehicle frame 12 comprised of structural members. The trailer is shown with a king pin housing 14 at one end of the bed to which a tractor unit 15 (partially shown in phantom) may be connected. The rear of the trailer is shown supported with a dual set of rear wheels 16, though it will be appreciated that the size and specific number of wheels may be varied to accommodate a particular application. In fact, as shown in FIGS. 10 and 11 and discussed in more detail below, the invention may be incorporated into what might be termed a "unit" truck wherein the cab and power source are integral with the load bed.

Figure 2:
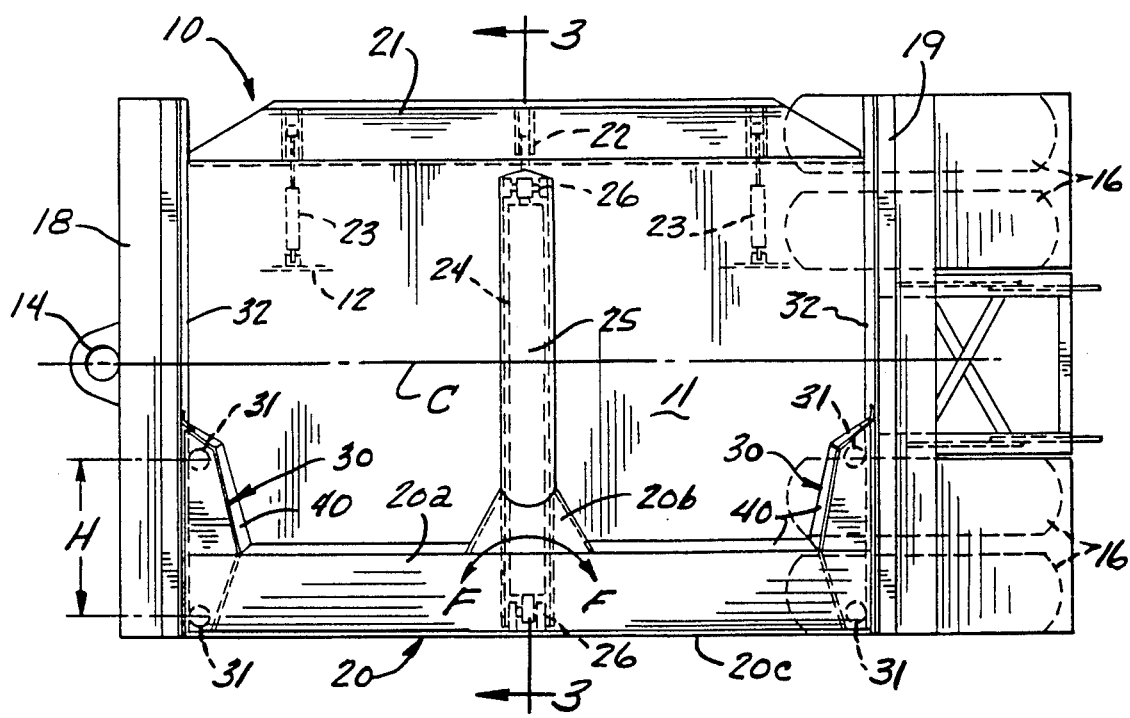
FIG. 2 is a plan view of the trailer shown in FIG. 1.

Substantially symmetrical front and rear chambered walls 18 and 19 are fixed to and extend upwardly from the load bed and define two side walls of a load-carrying box having the load bed 11 as its bottom. In keeping with the invention, a laterally translatable chambered ejection ram 20 is oriented longitudinally along the axis of the trailer and, in the fully retracted position shown in FIGS. 2 and 3, is at one side of the vehicle forming a lateral side wall of the load-carrying box. FIG. 4 shows the ejection ram 20 in the fully extended position. In keeping with the present invention, translation of the ejection ram between its retracted (FIG. 3) position and its extended (FIG. 4) position pushes the load L off the side of the load bed 11.

In the embodiment shown, as best indicated in FIGS. 2-4, another lateral side wall opposite the ejection ram 20 is provided in the form of a chambered drop gate 21. The drop gate 21 is hinged to the vehicle frame 12 via hinges 22 to permit the drop gate to assume the lowered position shown in phantom in FIG. 3 and also in FIG. 4 through the action of actuators 23. With the drop gate 21 in the lowered position, it serves as a deflector for the load (see arrow A in FIG. 4) to direct the material laterally away from the vehicle and, for example, over a bank along which the vehicle is traveling.

Considering the ejection ram 20 in more detail, it is shown fabricated from sheet stock. The specific configuration may vary from application to application depending upon the nature of the contemplated load and the forces which the load can be expected to exert on the ram face 20a. To this end, in the embodiment shown the lower panels of the ram face 20a are shown to have greater thickness than the upper panels, reflecting the expectation of generally higher forces near the load platform than higher up on the ram face. In addition to being fabricated of thinner material, the upper portion of the ejection ram face 20a slopes outwardly to not only increase load capacity but also provide a sloping surface to assist in the complete discharge of all of the load (see arrow B in FIG. 4).

For the purpose of translating the ejection ram 20 between its retracted and extended positions there is provided an actuator illustrated in the embodiment shown as a hydraulic cylinder 24 connected between the vehicle frame 12 and the ejection ram. In order to accommodate the elongate configuration of the hydraulic cylinder 24, a hollow tube 25 extends from the face of the ejection ram 20 in the direction of ram travel, i.e., horizontally and transversely to the longitudinal centerline (C in FIG. 1) of the trailer 10. If desired, the otherwise abrupt intersection of the tube 25 with the ram face 20a may be softened with a transition element 20b to facilitate complete ejection of the material as discussed above.

The outboard end 25a of the tube serves as the mounting point for the cylinder rod 24a. According to an aspect of the invention, the tube 25 and the cylinder 24 within it are mounted close to the load platform. This arrangement offers several advantages. It serves to minimize the reaction moment of the cylinder mount 26 relative to the load bed 11 and frame 12, avoiding high bending moments which might otherwise have to be resisted. It also permits the tube 25 to "pull" the ejection ram 20 from an elevation at which the load is expected to exert the highest forces on the ram face 20a. In addition, the close spacing between the load bed 12 and the lower surface of the tube 25 (dimension D in FIG. 3) serves to prevent wedging of material between the two.

In the embodiment shown the cylinder 24 is sized to maximize the travel of the ram 20 (distance S in FIG. 4) while using a single stroke unit. While a multiple stroke cylinder might be acceptable for some applications, a single stroke cylinder offers certain specific advantages. It maximizes the rod diameter/cylinder diameter ratio, with the attendant advantages of high strength, stability and capacity. Moreover, a single stage cylinder, coupled with the mounting of the cylinder to the load bed and frame and the rod to the tube, as illustrated, assures that the rod 24a will be fully protected within the tube 25 even when the cylinder is fully extended (see FIG. 4). The cylinder itself may be protected from any material which might drop behind the ejection ram (arrow E in FIG. 4). Such protection may, for example, take the form of a protective and reinforcing covering on the top half of the cylinder as shown in FIG. 5. In FIG. 5 a rubber faced, steel back sheet 27 is shown sandwiched between the outer surface of the hydraulic cylinder 24 and a formed section of high strength steel 28 held to the cylinder with band clamps 29. Such rubber faced, steel back sheet material is commercially available from the Gates Rubber Company; a suitable high strength steel is type XAR-15 available from the National Steel Company. It will be appreciated that a limitation on nature and amount of protection which can be placed over the cylinder 24 is the inside diameter of the tube 25. In this regard, it may be desirable to mount the cylinder 24 with its axis somewhat beneath the axis of the tube 25 to accommodate the extra thickness at the top of the cylinder. While the dropping of material behind the ram, as suggested above, is obviously undesirable and to be avoided to the extent possible, it is nevertheless a contingency which might occur in the course of normal use. The present design, which requires no lateral side wall or other structure rising above the load bed 11 beyond the ram 20 itself, is particularly advantageous in this regard. The rear, outboard face 20c of the ram 20 serves as a reverse-acting ram for overflow as the ram is retracted from its FIG. 4 position to its FIG. 3 position, discharging such overflow over the "back" edge of the load bed.

In keeping with a further aspect of the invention, provision is made to prevent both the cocking (arrow F—F in FIG. 2) and the tilting (arrow G—G in FIG. 3) of the ejection ram 20 as it traverses the load bed 11. This is accomplished in the embodiment shown with a roller and track arrangement. As shown in perspective view in FIG. 6 and in orthogonal views in FIGS. 7-9, the lower portion of each end of the ejection ram 20 flares into a horizontally-oriented roller housing 30. A pair of laterally and horizontally spaced rollers 31 within each roller housing 30 define, as viewed from above, a substantially rectangular configuration (as shown in FIG. 2) of sufficient width H (corresponding to the lateral, horizontal spacing between the rollers of a roller pair) to prevent cocking of the ram 20. The specific roller spacing H can vary from application to application, balancing the requirement for stability against cocking with the inherent limitation the roller spacing has on maintaining a high ratio between the travel S of the ram and the total width (distance W in FIG. 4) of the vehicle. Stated somewhat differently, since S must be somewhat less than the difference between W; and H in the embodiment shown, increasing H to increase stability against cocking has the result of reducing S. Different applications may result in the balance being struck at different points.

According to a further aspect of the present invention, the same rollers 31 which provide stability against cocking also provide stability against tilting. To this end, as shown most clearly in FIG. 9, in the embodiment shown the rollers 31 are V-notched and ride along ridged rails 32 fixed to the front and rear walls 18 and 19 respectively. With this arrangement, each pair of rollers 31 can react with the respective rail 32 to counteract tilting forces in either direction. It will be appreciated that the rails 32 may be readily and inexpensively fabricated from structural angle of a gauge commensurate with the strength required and abuse contemplated from the nature and magnitude of the load.

Provision may be made to facilitate replacement of the rollers 31 and/or to provide adjustment. As shown in FIGS. 6-9, the rollers 31 are journaled in blocks 34 bolted to the roller housing 30 with bolts 35. The V-roller/ridged rail arrangement illustrated also tends to be self-cleaning. The simplicity of this design, including the limitation of the moving parts to the four rollers themselves, is thought to be a factor which will contribute greatly to the durability and reliability of side ejection vehicles according to the present invention.

In order to assure as complete expulsion of the payload L from the load bed 11 and wide walls 18 and 19 as possible, and also to prevent an excessive amount of load material from entering the space between the ram edges and those surfaces, a series of wiper elements shown and numbered generally as 40 in FIGS. 6–9 are provided along the ram edges. These wiper elements 40 may be made replaceable and, if desired, adjustable to maintain a relatively close spacing to compensate for manufacturing tolerances for the various major elements of the trailer 10.

For certain applications it may be desirable to employ replaceable panels for the load bed 11 and/or for the inside surfaces of walls 18 and 19 to facilitate replacement in the event they are damaged or wear as a result of the friction generated during the side ejection. In addition, or alternatively, a high strength, abrasion resistant steel such as the XAR-15 steel identified above might be employed in these areas.

An alternative embodiment of the invention is shown in FIGS. 10 and 11. These figures demonstrate "unit" truck 100 embodying a side ejection unit virtually identical to that described above in connection with FIGS. 1–9. In this second embodiment the cab 101, tandem power sources 102 and the load bed 111 are mounted to an integral frame 112. The driven ground wheels 114 are shown supported from the underside of the frame 112 with hydraulic struts 115. Front wheel assemblies 116, such as the type disclosed in U.S. Pat. No. 3,820,818, may be employed for combined steering and cushioning capabilities. Other components which are identical to or similar in function to components in the first embodiment are assigned corresponding 100-series numbers. It is noted that an alternative arrangement is shown for the two actuators 123 which operate the drop gate 121. They are shown symmetrically placed within the chambered walls 118 and 119 and connected to opposite ends of the drop gate 121.

The choice between the trailer arrangement illustrated in the first embodiment and the unit truck illustrated in the second embodiment will depend upon the specific application. Whereas it is contemplated that trailers of the type shown might be employed for payloads up to about 150 tons, the truck shown in FIGS. 10 and 11 is scaled for a payload of up to about 400 tons.

We claim as our invention:

1. A side ejection mechanism for discharging a payload of material to the side of a vehicle comprising:
   a substantially horizontal and smooth load bed free of structure;
   substantially parallel front and rear walls fixed to and extending upwardly from the load bed, the front and rear walls each further comprising only a single ridged, horizontal rail substantially adjacent the load bed, the rails being substantially parallel and facing one another;
   an ejection ram laterally translatable between a retracted position at one side of the load bed and an extended position at the other, the ejection ram comprising a ram face substantially perpendicular to and extending substantially between the front and rear walls and a pair of laterally spaced rollers at each end to mate with and roll along each of the ridged horizontal rails, the rollers of each pair being substantially longitudinally aligned with the counterpart rollers of the other pair to form a substantially horizontal, rectangular configuration which permits lateral translation of the ejection ram from one side of the load bed to the other without cocking or tipping, the longitudinal spacing of each pair of rollers relative to the ram face being such that the ram may traverse substantially the entire load bed, the bottom edge of the ejection ram being substantially linear and closely adjacent the smooth load bed to scrape the load bed during the translation of the ram;
   one single stage hydraulic cylinder for actuating the ejection ram between its retracted and extended positions, the cylinder being mounted substantially horizontally substantially adjacent the load bed and acting on the ejection ram at substantially its mid-point, the ejection ram further comprising a hollow tube extending substantially horizontally and laterally from the ejection ram face at substantially its mid-point, the hydraulic cylinder being connected between the side of the load bed which corresponds to the retracted position of the ejection ram and the end of the tube remote from the ram face, the actuation of the hydraulic cylinder resulting in the actuation of the ejection ram, the tube serving to isolate at least a portion of the cylinder rod from material in the load bed.

2. The side ejection mechanism of claim 1, the blind end of cylinder housing being mounted to the load bed, the cylinder rod being mounted to the remote end of the tube.

3. The side ejection mechanism of claim 1, at least the top of the cylinder housing having reinforcement to protect it against damage from any material which might fall on it during extension of the ram.

4. The side ejection mechanism of claim 1 wherein the load bed is integrated onto a trailer, the trailer being adapted to be pulled with an independent prime mover.

5. The side ejection mechanism of claim 1 wherein the load bed is integrated onto a unit truck, the truck having an integral frame to which at least the load bed, an operator's cab, wheels, including steerable wheels, and a power source and drive train are mounted.

6. The side ejection mechanism of claim 1 further comprising a drop gate along the side edge of the load bed opposite the retracted position of the ejection ram, the drop gate being shiftable between a raised position in which a surface thereof faces inwardly with a substantial vertical component extending upwardly from the load bed to serve as a wall to retain material on the load bed and a lowered position in which said surface of the drop gate slopes outwardly and downwardly from said side edge of the load bed to serve as a lateral deflector for material as it is pushed off the load bed by the ejector ram.

7. The side ejection mechanism of claim 1, the rails having a V cross section, the rollers having a mating V notch.

8. The side ejection mechanism of claim 1, the ejection ram having a rear face which clears the load bed of overflow material by pushing it off the load bed as the ram retracts.

* * * * *